United States Patent [19]

Kuhn et al.

[11] Patent Number: 5,399,616
[45] Date of Patent: Mar. 21, 1995

[54] LUBRICANT-CONTAINING AQUEOUS PREPARATIONS OF COPOLYMERS

[75] Inventors: Martin Kuhn, Dornach, Switzerland; Philippe Ouziel, Riedisheim, France; Hans-Ulrich Berendt, deceased, late of Allschwil, Switzerland, by Ursel R. Berendt-Schmidt

[73] Assignee: Ciba-Geigy Corporation, Ardsley, N.Y.

[21] Appl. No.: 46,349

[22] Filed: Apr. 8, 1993

Related U.S. Application Data

[63] Continuation of Ser. No. 853,470, Mar. 18, 1992, abandoned.

[30] Foreign Application Priority Data

Mar. 25, 1991 [CH] Switzerland ............................ 896/91
May 21, 1991 [CH] Switzerland .......................... 1504/91

[51] Int. Cl.$^6$ ...................... C08L 71/02; C09B 67/00
[52] U.S. Cl. ..................... 524/765; 524/767; 524/773; 524/310; 524/311; 524/317; 525/42; 525/48; 525/403; 525/404; 525/445; 8/557; 8/573; 8/582
[58] Field of Search ............... 524/765, 767, 773, 310, 524/311, 317; 525/42, 48, 403, 404, 445

[56] References Cited

U.S. PATENT DOCUMENTS

| | | | |
|---|---|---|---|
| 4,119,680 | 10/1978 | Vachon | 525/39 |
| 4,494,956 | 1/1985 | Schäfer et al. | 525/48 |
| 4,705,525 | 11/1987 | Abel et al. | 8/555 |
| 4,931,497 | 6/1990 | Engelhardt et al. | 525/42 |
| 4,946,932 | 8/1990 | Jenkins | 525/39 |

FOREIGN PATENT DOCUMENTS

0356242 2/1990 European Pat. Off. .

OTHER PUBLICATIONS

J. Med. Chem. vol. 16, No. 11, p. 1207 (1973).
The Parachors of Organic Compounds, Chem, Revs. pp. 439–485 (1953).
Chem Abst 100:69227c.

*Primary Examiner*—Paul R. Michl
*Assistant Examiner*—Olga Asinovsky
*Attorney, Agent, or Firm*—Kevin T. Mansfield

[57] ABSTRACT

Lubricant-containing aqueous preparations of copolymers are obtainable by polymerisation of (A) 70 to 95% by weight of a monomer mixture of
  (a) 20 to 90% by weight of an ethylenically unsaturated carboxylic acid, in particular of a monocarboxylic acid, or of a corresponding amide,
  (b) 10 to 80% by weight of a sulfonated, aliphatic or aromatic monovinyl compound, and
  (c) 0 to 25% by weight of N-vinylpyrrolidone or of an N-vinyl-substituted amide of a saturated aliphatic monocarboxylic acid in the presence of (B) 5 to 30% by weight of a polyol whose hydroxyl groups have been esterified with a fatty acid of 8 to 26 carbon atoms, the sum totals of (A) and (B) on the one hand and (a), (b) and (c) on the other each adding up to 100%.

The novel preparations are suitable for use as textile auxiliaries, in particular for preventing crease marks in textile wet processing,

21 Claims, No Drawings

LUBRICANT-CONTAINING AQUEOUS PREPARATIONS OF COPOLYMERS

This application is a continuation of application Ser. No. 07/853,470, filed Mar. 18, 1992, now abandoned.

The present invention relates to lubricant-containing aqueous preparations of copolymers, in which the lubricant is present in solution or dispersion, and to the use of these preparations as dyeing and textile auxiliaries, in particular as crease preventives in textile wet processing.

EP-A-207 003 discloses anti-crease polymers prepared by radical induced solution polymerisation of ethylenically unsaturated carboxylic acids, sulfonic acids or else acrylamide in the presence of a diesterified polyalkylene glycol.

It is an object of the present invention to make available a crease preventive for textile materials which comprises an aqueous preparation of a copolymer and a lubricant dissolved or dispersed therein and which, compared with the state of the art, reduces the substrate-substrate friction of textile materials and thereby prevents the formation of crease marks and also the associated unlevel dyeing of cellulose or polyester material when dyeing in the jet or on the winch beck.

The preparations according to the present invention are obtainable by polymerising
(A) 70 to 95% by weight of a monomer mixture of
    (a) 20 to 90% by weight of an ethylenically unsaturated carboxylic acid, in particular of a monocarboxylic acid, or of a corresponding amide,
    (b) 10 to 80% by weight of a sulfonated, aliphatic or aromatic monovinyl compound, and
    (c) 0 to 25% by weight of N-vinylpyrrolidone or of an N-vinyl-substituted amide of a saturated aliphatic monocarboxylic acid, and
(B) 5 to 30% by weight of a polyol whose hydroxyl groups have been esterified with a fatty acid of 8 to 26 carbon atoms, the sum totals of (A) and (B) on the one hand and (a), (b) and (c) on the other each adding up to 100%.

The novel preparations can be solutions, dispersions or emulsions, depending on the structure of the diesterified polyols used as lubricants. Preferably, preparations according to the present invention contain copolymers which are obtainable from a monomeric mixture consisting of 30 to 90% by weight of monomer (a) and 10 to 70% by weight of monomer (b).

As ethylenically unsaturated carboxylic acids or amides thereof for use in the polymerisable monomer mixture (A) it is possible to consider aliphatic mono- or dicarboxylic acids or amides thereof which each have an ethylenically unsaturated aliphatic radical and preferably not more than 7 carbon atoms.

The monocarboxylic acids are for example acrylic acid, methacrylic acid, α-haloacrylic acid, 2-hydroxyethylacrylic acid, α-cyanoacrylic acid, crotonic acid and vinylacetic acid. Ethylenically unsaturated dicarboxylic acids are preferably fumaric acid, maleic acid, itaconic acid, and also mesaconic acid, citraconic acid, glutaconic acid and methylenemalonic acid. Ethylenically unsaturated carboxamides are preferably acrylamide and methacrylamide, which may each be substituted for example by $C_1$–$C_4$alkyl, $C_2$–$C_4$hydroxyalkyl, $C_2$–$C_4$alkoxyalkyl, acetyl, acetyl-$C_1$–$C_2$alkyl, —$CH_2CONH_2$ or

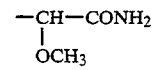

at the nitrogen atom, e.g. N-methylacrylamide, N,N-dimethylacrylamide, N-methoxymethacrylamide, N-β-hydroxyethylacrylamide, N-diacetoneacrylamide, N-acetylacrylamide, N-acryloylamidoacetamide (acryloylglycine) or N-acryloylamidomethoxyacetamide and also N,N-di-β-hydroxyethylacrylamide. It is also possible to use mixtures of monomers (a).

Preferably, the monocarboxylic acids or amides thereof each have 3 to 5 carbon atoms, and are in particular methacrylic acid or methacrylamide and especially acrylic acid, acrylamide or mixtures thereof.

The sulfonated vinyl compounds (b) to be used according to the present invention include in particular vinylsulfonic acid, allylsulfonic acid, 2-acrylamido-2-methylpropanesulfonic acid, 3-methacrylamidopropanesulfonic acid, 3-acrylamidopropanesulfonic acid, 3-sulfopropyl acrylate, 3-sulfopropyl methacrylate, bis(3-sulfopropyl itaconate), 4-styrenesulfonic acid and 3-allyloxy-2-hydroxypropylsulfonic acid. The monomers (b) can be used as free acids or as ammonium or alkali metal salts, in particular as potassium, lithium or sodium salts.

The facultative vinyl compounds (c) include in particular N-vinyl-substituted amides of aliphatic saturated monocarboxylic acids of 1 to 4 carbon atoms, e.g. N-vinylformamide, N-vinyl-N-methylformamide, N-vinylacetamide, N-methyl-N-vinylacetamide or N-ethyl-N-vinylacetamide. Preferred monomers (c) are N-vinylpyrrolidone and N-vinyl-N-methylacetamide.

Suitable components (B) are the diesters of polyalkylene glycols formed from 3 to 200 mol, preferably 3 to 100 mol, of alkylene oxide, e.g. ethylene oxide, propylene oxide or mixtures of ethylene oxide and propylene oxide. Preference is given to using diesters of these polyalkylene glycols with long-chain fatty acids of 12 to 22 carbon atoms. The unesterified polyalkylene glycols advantageously have a molecular weight of 150 to 8800, especially 300 to 4400, preferably 300 to 1000. The alkylene glycols are esterified by reacting the alkylene glycols with 2 mol of fatty acid. It is also possible first to add alkylene oxide onto the fatty acid and then to esterify the fatty acid-alkylene oxide adduct with the same fatty acid or another fatty acid. The fatty acids can be saturated or unsaturated, e.g. caprylic, capric, lauric, myristic, palmitic, coco fatty, stearic, tallow fatty, arachic, behenic, lignoceric or cerotic acid or decenic, dodecenic, tetradecenic, hexadecenic, oleic, elaeostearic, linoleic, linolenic, ricinoleic or arachidonic acid. Of these, solid fatty acids are preferred, e.g. tallow fatty acid, palmitic, arachic, behenic and in particular stearic acid.

As component (B) it is also possible to use trihydric to hexahydric aliphatic alcohols of 3 to 6 carbon atoms which have been esterified with the abovementioned fatty acids, in particular stearic acid or behenic acid. The polyhydric alcohols can be straight-chain or branched. Examples are glycerol, trimethylolethane, trimethylolpropane, erythritol, pentaerythritol, mannitol and sorbitol. Preferred components (A) based on these polyols are 1,1,1-trishydroxymethylpropane tristearate and 1,1,1-trishydroxymethylpropane tribehenate.

Preparations according to the present invention advantageously contain as active ingredient from 75 to 95% of the polymerised monomer mixture (A) and from 5 to 25% by weight of the defined esterified polyol (B) as lubricant.

The monomer mixture consists in particular of 35 to 85% by weight of the ethylenically unsaturated carboxylic acid or of the amide (a) and 15 to 65% by weight of the sulfonated vinyl compound (b). Both the sum totals of components (A) and (B) and of components (a) and (b) are 100%.

Of these preparations, the preferred ones contain 5 to 25% by weight of defined esterified polyol, in particular of a diesterified polyethylene oxide adduct, 35 to 75% by weight of acrylic acid or acrylamide and 20 to 40% by weight of the sulfonated vinyl compound, in particular 2-acrylamido-2-methylpropanesulfonic acid, the sum total of the components being 100%. The indicated percentages are based on dry substance.

The preparations according to the present invention are prepared by methods known per se, advantageously in such a way that the monomer mixture (A), composed of (a), (b) and optionally (c), and the diesterified polyol (B) are dissolved in water or if necessary dispersed therein with the aid of an auxiliary dispersant, e.g. Polysorbate 80, and polymerised in the presence of free radical initiators, advantageously at a temperature of 40° to 100° C. The products are copolymer solutions in which the esterified polyol (B) is present in solution or dispersion.

The preparations according to the present invention can also be prepared by initially copolymerising the monomers (a), (b) and optionally (c) in aqueous solution and then dissolving or emulsifying the esterified polyols (B) in the copolymer solution at temperatures above their melting points.

The catalysts used are advantageously organic or inorganic initiators which form free radicals. Suitable organic initiators for carrying out the free radical polymerisation are for example azoamides, e.g. azobis-2-methyl(1,1-dimethyl-2-hydroxyethyl)propionamide, 2,2'-azobis(2-methylpropiohydroxamic acid), 2,2'-azobis-2-[N-phenylamidino]propane dihydrochloride, 2,2'-azobis-2-methylpropionohydrazide, 2,2'-azobis-N,N-dimethyleneisobutylamidine or in particular 2,2'-azobis(2-amidinopropane) dihydrochloride. Suitable inorganic initiators are hydrogen peroxide, perborates, percarbonates, e.g. sodium percarbonate, persulfates, peroxodisulfates, e.g. potassium peroxodisulfate, and also redox systems known from the relevant literature.

These catalysts can be used in amounts of 0.05 to 2 per cent by weight, advantageously 0.05 to 1 per cent by weight, preferably 0.1 to 0.5 per cent by weight, based on the starting materials.

The copolymerisation is advantageously carried out in an inert atmosphere, for example in the presence of nitrogen.

The copolymerisation of monomer mixture (A) in the presence of the esterified polyol (B) may produce graft polymers as by-products. These graft polymers have no adverse influence on the activity profile, even if the polymerization is carried out under conditions under which these by-products are produced in major amounts.

The preparations according to the present invention are obtained as highly viscous aqueous solutions or dispersions having a solids content of for example 0.5 to 20% by weight, preferably 2 to 10% by weight. To preserve and/or improve the storage stability of the aqueous copolymer solutions Obtained it is possible to add preservatives, for example chloroacetamide, N-hydroxymethylchloroacetamide, pentachlorophenolates, alkali metal nitrites, triethanolamine or hydroquinone monomethyl ether, or else antibacterial agents, for example sodium azide, or surface-active quaternary ammonium compounds which have one or two fatty alkyl radicals. Advantageously it is also possible to use mixtures of these preservatives and germicidal compounds.

The particularly preferred 2–10% by weight preparations exhibit ideal or pseudoplastic flow properties, depending on the chemical composition of the copolymers. Their dynamic viscosity at 20° C. varies with the shear rate between 40 and 100,000, preferably between 100 and 30,000, in particular between 100 and 15,000, mPa.s (millipascalsecond).

The preparations according to the present invention give improved friction-reducing effects compared with the state of the art and therefore are particularly suitable for employment in textile wet processing.

They are used in particular as crease preventives in the dyeing of cellulose fibres, polyester fibres, synthetic polyamide fibres or mixtures of these types of fibre, and also in the dyeing of wool or polyacrylonitrile fibres, since they greatly reduce the adhesion forces (friction) of the textile material, thereby reducing the formation of creases. In addition, they increase the colour yield and also have a foam-suppressing effect.

Preparations according to the present invention give stable dyeing liquors also in the presence of levelling additives, for example quaternary fatty amine ethoxylates. In contradistinction to what happens when high molecular weight polyacrylic acid salts are used, there is no precipitation of dye to make the dyeing specky.

The present invention accordingly also provides a process for dyeing or whitening textile materials which contain cellulose fibres, natural or synthetic polyamide fibres, polyacrylonitrile fibres and in particular cotton and/or polyester fibres with appropriate dyes or fluorescent whitening agents, which comprises dyeing or whitening the textile materials in the presence of the preparations according to the present invention.

The amounts in which the preparations according to the present invention are added to the dyebaths or whitening liquors are advantageously between 0.01 and 5% by weight, especially 0.05 and 4, preferably 0.2 and 3,% by weight, based on the weight of the textile material.

Suitable cellulose fibre material is material made of regenerated or in particular natural cellulose, for example staple viscose, filament viscose, hemp, linen, jute or preferably cotton.

Cellulose fibre materials are in general dyed with substantive dyes, vat dyes, leuco vat dye esters or in particular reactive dyes.

Suitable substantive dyes are the customary direct dyes, for example the direct dyes mentioned in the Colour Index 3rd Edition (1971) Vol. 2 on pages 2005–2478.

The vat dyes in question are highly fused and heterocyclic benzoquinones or naphthoquinones, sulfur dyes and in particular anthraquinonoid or indigoid dyes. Examples of vat dyes which are usable according to the present invention are listed in the Colour Index 3rd Edition (1971) Vol. 3 on pages 3649 to 3837 as sulphur dyes and vat dyes.

Leuco vat dye esters are obtainable for example from vat dyes of the indigo, anthraquinone or indanthrene series by reduction, for example with iron powder, and subsequent esterification, for example with chlorosulfonic acid, and are listed in the Colour Index 3rd Edition 1971, Vol. 3, as solubilised vat dyes.

Reactive dyes are customary dyes which form a chemical bond with the cellulose, for example the reactive dyes listed in the Colour Index in Volume 3 (3rd Edition, 1971) on pages 3391-3560 and in Volume 6 (revised 3rd Edition, 1975) on pages 6268-6345.

The synthetic polyamide fibre materials, in particular textile materials, which can be dyed in the presence of the novel copolymers are for example those formed from adipic acid and hexamethylenediamine (nylon 6.6), from ε-caprolactam (nylon 6), from ω-aminoundecanoic acid (nylon 11), from ω-aminoenanthic acid (nylon 7), from ω-aminopelargonic acid (nylon 8) or from sebacic acid and hexamethylenediamine (nylon 6.10).

Synthetic or natural polyamide fibre materials are in general dyed with anionic dyes.

Anionic dyes are for example salts of heavy metal-containing or preferably metal-free azomethine, mono-, dis- or polyazo dyes, including formazan dyes, and also of anthraquinone, xanthene, nitro, triphenylmethane, naphthoquinoneimine and phthalocyanine dyes. The ionic character of these dyes may be due to metal complex formation alone and/or preferably due to acid, salt-forming substituents, such as carboxylic acid groups, sulfuric and phosphonic ester groups, phosphonic acid groups or preferably sulfonic acid groups. These dyes may also contain in the molecule reactive groups which enter a covalent bond with the textile material. Preference is given to the acid metal-free dyes. The latter preferably contain only a single sulfonic acid group and optionally one further, but not salt-forming, water-solubilising group such as the acid amide or alkylsulfonyl group.

Of particular interest are also the 1:1 or preferably 1:2 metal complex dyes. The 1:1 metal complex dyes preferably have one or two sulfonic acid groups. As metal they contain a heavy metal atom for example copper, nickel or in particular chromium.

The 1:2 metal complex dyes contain as central atom a heavy metal atom, for example a cobalt atom or in particular a chromium atom. The central atom is linked to two complexing components, of which at least one is a dye molecule or, preferably, both are dye molecules. These two dye molecules involved in the complex can be identical or different. The 1:2 metal complex dyes can contain for example two azomethine molecules, one disazo dye and one monoazo dye or preferably two monoazo dye molecules. The azo dye molecules may contain water-solubilising groups, for example acid amide, alkylsulfonyl or the abovementioned acid groups. Preference is given to 1:2 cobalt or 1:2 chromium complexes of monoazo dyes which have acid amide, alkylsulfonyl or in total a single sulfonic acid group.

It is also possible to use mixtures of anionic dyes.

Suitable polyester fibre material for dyeing or whitening in the presence of the copolymer includes for example cellulose ester fibres such as cellulose acetate fibres and cellulose triacetate fibres, in particular linear polyester fibres. Linear polyester fibres are synthetic fibres obtained for example by the condensation of terephthalic acid with ethylene glycol or of isophthalic acid or terephthalic acid with 1,4-bis(hydroxymethyl)-cyclohexane, and also copolymers of terephthalic and isophthalic acid and ethylene glycol. The linear polyester hitherto almost exclusively used in the textile industry is obtained from terephthalic acid and ethylene glycol.

The disperse dyes to be used for the dyeing of polyester fibre materials are only very sparingly soluble in water and are mostly present in the dyeing liquor in the form of a very fine dispersion and can belong to a very wide range of dye classes, for example to the acridone, azo, anthraquinone, coumarin, methine, perinone, naphthoquinoneimine, quinophthalone, styryl or nitro dyes. It is also possible to use mixtures of disperse dyes.

Polyacrylonitrile fibres are advantageously dyed with cationic dyes. As cationic dyes it is possible to use not only migrating but also non-migrating dyes.

Suitable migrating cationic dyes are in particular those having a more or less delocalised positive charge, a cation weight of less than 310, a parachor of less than 750 and a log P of less than 3.2. The parachor is calculated as described in a paper by O. R. Quayle [Chem. Rev. 53,439 (1953)] and the log P is indicative of the relative lipophilicity, and its calculation was described by C. Hanach et al [J. Med. Chem. 16 (1973)].

Non-migrating cationic dyes are in particular those whose cation weight is greater than 310 and whose parachor is greater than 750.

The cationic, migrating and non-migrating, dyes can belong to various dye classes. They are in particular salts, for example chlorides, sulfates or metal halides, e.g. zinc chloride double salts, of azo dyes such as monoazo dyes or hydrazone dyes, anthraquinone, diphenylmethane, triphenylmethane, methine, azomethine, coumarin, ketoneimine, cyanine, xanthene, azine, oxazine or thiazine dyes.

It is possible to use mixtures of cationic dyes. Particular preference is given to dye combinations of at least 2 or preferably 3 migrating or non-migrating cationic dyes for preparing level dichromatic or trichromatic dyeings, for which it is also possible to use mixtures of migrating and non-migrating cationic dyes.

The fibre materials can also be used as blend fabrics with each other or with other fibres, for example blends of polyacrylonitrile-polyester, polyamide-polyester, polyamide-cotton, polyester-viscose, polyacrylonitrile-wool and polyester-wool.

Fibre blends of polyester and cotton are in general dyed with combinations of disperse dyes and vat dyes, sulfur dyes, leuco vat ester dyes, direct dyes or reactive dyes, the polyester portion being dyed with disperse dyes beforehand, at the same time, or afterwards.

Polyester-wool blend fibre materials are preferably dyed according to the present invention with commercial mixtures of anionic dyes and disperse dyes.

The textile material to be dyed can be in various forms. Preference is given to dyeing piece goods, such as knitted or woven fabrics.

Preparations according to the present invention can also be used in the whitening of undyed synthetic fibre materials with fluorescent whitening agents dispersed in water. Fluorescent whitening agents can belong to any desired chemical class. They are in particular coumarins, triazolecoumarins, benzocoumarins, oxazines, pyrazines, pyrazolines, diphenylpyrazolines, stilbenes, styrylstilbenes, triazolylstilbenes, bisbenzoxazolylethylenes, stilbenebisbenzoxazoles, phenylstilbenebenzoxazoles, thiophenebisbenzoxazoles, naphthalenebisbenzoxazoles, benzofurans, benzimidazoles and naphthalimides.

It is also possible to use mixtures of fluorescent whitening agents.

The amount of dye or fluorescent whitening agent to be added to the liquor depends on the desired depth of shade; in general, suitable amounts range from 0.01 to 10, preferably from 0.2 to 5,% by weight, based on the textile material used.

As well as the dyes or fluorescent whitening agents and the novel preparations of copolymers, the dyeing or whitening liquors may also contain, depending on the textile material to be treated, wool protectives, oligomer inhibitors, oxidising agents, antifoams, emulsifiers, levelling agents, retarders and preferably dispersants.

The dispersants are used in particular for achieving fine dispersion of the disperse dyes. The dispersants used are the dispersants generally customary in the dyeing of disperse dyes.

Suitable dispersants are preferably sulfated or phosphated addition products of 15 to 100 mol of ethylene oxide or preferably propylene oxide with polyhydric aliphatic alcohols of 2 to 6 carbon atoms, e.g. ethylene glycol, glycerol or pentaerythritol, or with amines of 2 to 9 carbon atoms which have at least two amino groups or one amino group and one hydroxyl group, and also with alkanesulfonates having 10 to 20 carbon atoms in the alkyl chain, alkylbenzenesulfonates having straight-chain or branched alkyl of 8 to 20 carbon atoms in the alkyl chain, e.g. nonyl- or dodecyl-benzenesulfonate, 1,3,5,7-tetramethyloctylbenzenesulfonate or sulfosuccinic esters, such as sodium dioctyl sulfosuccinate.

Of particular advantage as anionic dispersants are ligninsulfonates, polyphosphates and preferably formaldehyde condensation products of aromatic sulfonic acids, formaldehyde and optionally mono- or bifunctional phenols, for example of cresol, β-naphtholsulfonic acid and formaldehyde, of benzenesulfonic acid, formaldehyde and naphthoic acid, of naphthalenesulfonic acid and formaldehyde, or of naphthalenesulfonic acid, dihydroxydiphenyl sulfone and formaldehyde. Preference is given to the disodium salt of di(6-sulfo-2-naphthyl)methane.

It is also possible for mixtures of anionic dispersants to be used. Normally, the anionic dispersants are present in the form of their alkali metal salts, ammonium salts or amino salts. These dispersants are preferably used in an amount of 0.1 to 5 g/l of liquor.

The dyeing or whitening liquors may in addition to the auxiliaries already mentioned and depending on the dye and substrate to be used also contain customary additives, advantageously electrolytes such as salts, e.g. sodium sulfate, ammonium sulfate, sodium or ammonium phosphates or polyphosphates, metal chlorides or nitrates such as sodium chloride, calcium chloride, magnesium chloride or calcium nitrate, ammonium acetate or sodium acetate and/or acids, for example mineral acids such as sulfuric acid or phosphoric acid, or organic acids, advantageously lower aliphatic carboxylic acids such as formic, acetic or oxalic acid, and also alkalis or alkali donors and/or complexing agents.

The acids are used in particular for setting the pH of the liquors to be used according to the present invention, the pH being in general 3 to 6.5, preferably 4.5 to 6.

If reactive dyes are used, the preparations generally contain fixing alkalis.

The alkaline compounds used for fixing the reactive dyes are for example sodium carbonate, sodium bicarbonate, sodium hydroxide, disodium phosphate, trisodium phosphate, borax, aqueous ammonia or alkali donors such as sodium trichloroacetate. A very highly suitable alkali is in particular a mixture of sodium silicate and a 30% aqueous sodium hydroxide solution.

The pH of the alkali-containing dyeing liquors is in general 7.5 to 12.5, preferably 8.5 to 11.5.

The dyeings or whitenings are advantageously effected from an aqueous liquor by the exhaust method. The liquor ratio may accordingly vary within a wide range, for example from 4:1 to 100:1, preferably from 6:1 to 50:1. The temperature at which the dyeing or whitening is carded out is at least 70° C. and in general not higher than 140° C. It is preferably within the range from 80° to 135° C.

Linear polyester fibres and cellulose triacetate fibres are preferably dyed by the high temperature method in sealed and expediently also pressure-resistant apparatus at temperatures above 100° C, preferably between 110° and 135° C., under atmospheric or superatmospheric pressure. Suitable sealed vessels are for example circulation machines such as package or beam dyeing machines, winch becks, jet or drum dyeing machines, muff dyeing machines, paddles or jiggers.

Cellulose acetate fibres are preferably dyed at temperatures of 80°-85° C.

If the material to be dyed is cellulose fibre material or synthetic polyamide fibre material alone, the dyeing is advantageously carried out at a temperature of 20° to 106° C., preferably at 30° to 95° C. for cellulose fibres and 80° to 95° C. for polyamide fibres.

Polyester-cotton fibre materials are preferably dyed at temperatures of above 106° C. and advantageously at 110° to 135° C. These blend fibre materials can be dyed in the presence of carriers or carrier mixtures which act as accelerants for the dyeing of the polyester portion with disperse dyes.

The dyeing process can be carried out in such a way that the material to be dyed is either first briefly treated with the preparation according to the present invention and then dyed or preferably treated simultaneously with the preparation and the dye.

The dyeings are finished by cooling the dyeing liquor down to 40° to 70° C., rinsing the dyeings with water and if necessary a conventional reduction clear in an alkaline medium. The dyeings are then rinsed again and dried. If carders were used, the dyeings are advantageously additionally subjected to a heat treatment, for example thermosoling, preferably at 160° to 180° C. for 30 to 90 seconds, to improve the lightfastness. If vat dyes were used for the cellulose portion, the dyed material is as usual first treated with hydrosulfite at pH 6 to 12.5 and then with an oxidising agent and finally washed off.

The dyeing process according to the present invention gives strong uniform dyeings which have a high colour yield. More particularly, the dyeings obtained are level and the material is crease-free (Monsanto image 2–4; friction value 35 to 70%), has a solid appearance and possesses a pleasant, soft handle.

Moreover, the fastness properties of the dyeings, for example lightfastness, rubfastness and wetfastness proprerties, are not adversely affected by the use of the auxiliary mixture. Nor does any troublesome foam arise when dyeing the textile material in the presence of the preparations according to the present invention.

In the preparation and use examples which follow, the percentages are by weight, unless otherwise stated. The amounts relate in the case of dyes to commercial, i.e. diluted, material and in the case of the components of the auxiliary mixture to pure substance. Any five-digit Colour Index numbers (C.I.) relate to the 3rd edition of the Colour Index.

PREPARATION EXAMPLES

Example 1

A solution of 165 g of 2-acrylamido-2-methylpropanesulfonic acid in 5500 g of water is neutralised with 106 g of a 30% sodium hydroxide solution and combined with 1700 g of a 30% aqueous acrylamide solution. 124.5 g of polyethylene glycol 400 distearate and 10 g of Polysorbate are heated to 60° C. under nitrogen. Then the combined monomer solution and a solution of 5 g of potassium persulfate in 655 g of water are simultaneously added dropwise in the course of 4 hours. On completion of the dropwise addition the polymerization is continued at 60° C. for a further 2 hours. The polymerisation product is then cooled down with stirring. 10.9 g of chloroacetamide are added and stirring is continued for a further 3 hours. This gives 8320 g of a viscous, readily pourable dispersion having an active ingredient solids content of 10 per cent by weight.

Dynamic viscosity of a 5% solution in mPa.s at 25° C. as a function of the measuring shear rate $v_s$.

| Shear rate $v_s$ (sec$^{-1}$) | | |
|---|---|---|
| 0.04 | 0.5 | 5.5 |
| Dynamic viscosity $\eta$ (mPa.s) | | |
| 110 | 102 | 99 |

Relative to water, the friction value of which is set equal to 100%, the friction value of this preparation was 61% on cotton and 62% on 67:33 polyester-cotton blends. The friction values are determined with a Low Shear Rheometer.

Example 2

A solution of 7.55 g of 2-acrylamido-2-methylpropanesulfonic acid and 10.5 g of acrylic acid in 50 g of water is neutralised with 23.3 g of a 30% aqueous sodium hydroxide solution and adjusted to pH 6. To this solution is added 12.9 g of acrylamide in solid form, which is followed by stirring until everything has dissolved. The solution is added to 5.7 g of polyethylene glycol 400 distearate and 0.5 g of Polysorbate 80. The mixture is heated to 70° C. under nitrogen. Then a solution of 0.33 g of sodium persulfate in 10 g of water is slowly added dropwise. To maintain stirrability, 90 ml of water are also added dropwise continuously at the same time. On completion of the dropwise addition the polymerization is continued for 2 hours with stirring to completion. After cooling down, the mixture is diluted with 203 g of water and further stirred until homogeneous. This gives 413.7 g of a viscous, readily pourable dispersion having an active ingredient solids content of 10%. The product exhibits pseudoplastic behaviour.

Dynamic viscosity of a 5% solution in mPa.s at 25° C. as a function of the measuring shear rate $v_s$.

| Shear rate $v_s$ (sec$^{-1}$) | | |
|---|---|---|
| 0.04 | 0.5 | 5.5 |
| Dynamic viscosity $\eta$ (mPa.s) | | |
| 7021 | 5755 | 3500 |

The friction value is 43% on cotton and 38% on polyester-cotton.

The procedure described in Examples 1 and 2 is repeated to prepare the following novel preparations of copolymers in the form of 10% aqueous solutions. The indicated percentages are based on the starting materials used.

Example 3

Preparation obtainable from 14.1% of 1,1,1-trishydroxymethylpropane tristearate
22% of acrylamide
63.9% of 2-acrylamido-2-methylpropanesulfonic acid

| Shear rate $v_s$ (sec$^{-1}$) | | |
|---|---|---|
| 0.04 | 0.5 | 5.5 |
| Dynamic viscosity $\eta$ (mPa.s) | | |
| 723 | 695 | 559 |

Friction value 45% on cotton, 32% on polyester-cotton.

Example 4

14.1% of 1,1,1-trishydroxymethylpropane tribehenate
22.2% of acrylic acid
63.7% of 2-acrylamido-2-methylpropanesulfonic acid

| Shear rate $v_s$ (sec$^{-1}$) | | |
|---|---|---|
| 0.04 | 0.5 | 5.5 |
| Dynamic viscosity $\eta$ (mPa.s) | | |
| 144 | 144 | 144 |

Friction value 45% on cotton, 50% on polyester-cotton.

Example 5

18.9% of 1,1,1-trishydroxymethylpropane tristearate
46.9% of acrylamide
34.2% of 2-acrylamido-2-methylpropanesulfonic acid

| Shear rate $v_s$ (sec$^{-1}$) | | |
|---|---|---|
| 0.04 | 0.5 | 5.5 |
| Dynamic viscosity $\eta$ (mPa.s) | | |
| 4740 | 2242 | 1500 |

Friction value 35% on cotton, 33% on polyester-cotton.

Example 6

16% of 1,1,1-trishydroxymethylpropane tristearate
28.5% of acrylamide
55.5% of 2-acrylamido-2-methylpropanesulfonic acid

| Shear rate $v_s$ (sec$^{-1}$) | | |
|---|---|---|
| 0.04 | 0.5 | 5.5 |
| Dynamic viscosity $\eta$ (mPa.s) | | |
| 1029 | 996 | 700 |

Friction value 37% on cotton, 28% on polyester-cotton.

Example 7

17.6% of polyethylene glycol 400 distearate
58.6% of acrylic acid
23.8% of sodium 4-styrenesulfonate

| Shear rate $v_s$ (sec$^{-1}$) | | |
|---|---|---|
| 0.04 | 0.5 | 5.5 |
| Dynamic viscosity $\eta$ (mPa.s) | | |

Example 8

25.2% of polyethylene glycol 400 distearate
40.4% of acrylic acid
34.4% of 3-sulfopropyl methacrylate

| Shear rate $v_s$ (sec$^{-1}$) | | |
|---|---|---|
| 0.04 | 0.5 | 5.5 |
| Dynamic viscosity $\eta$ (mPa.s) | | |
| 1500 | 1169 | 612 |

Friction value 64% on cotton, 54% on polyester-cotton.

Example 9

25% of polyethylene glycol 400 distearate
41.5% of acrylic acid
33.5% of 3-sulfopropyl acrylate

| Shear rate $v_s$ (sec$^{-1}$) | | |
|---|---|---|
| 0.04 | 0.5 | 5.5 |
| Dynamic viscosity $\eta$ (mPa.s) | | |
| 207 | 202 | 202 |

Friction value 55% on cotton, 55% on polyester-cotton.

Example 10

11.5% of polyethylene glycol 400 distearate
34.5% of acrylic acid
54% of sodium vinylsulfonate

| Shear rate $v_s$ (sec$^{-1}$) | | |
|---|---|---|
| 0.04 | 0.5 | 5.5 |
| Dynamic viscosity $\eta$ (mPa.s) | | |
| 195 | 104 | 42 |

Friction value 53% on cotton, 45% on polyester-cotton.

Example 11

25% of polyethylene glycol 400 distearate
43.6% of acrylic acid
31.4% of 2-acrylamido-i-methylpropanesulfonic acid

| Shear rate $v_s$ (sec$^{-1}$) | | |
|---|---|---|
| 0.04 | 0.5 | 5.5 |
| Dynamic viscosity $\eta$ (mPa.s) | | |
| 280 | 257 | 212 |

Friction value 62% on cotton, 51% on polyester-cotton.

Example 12

25% of polyethylene glycol 400 distearate
56.8% of acrylic acid
18.2% of 2-acrylamido-2-methylpropanesulfonic acid

| Shear rate $v_s$ (sec$^{-1}$) | | |
|---|---|---|
| 0.04 | 0.5 | 5.5 |
| Dynamic viscosity $\eta$ (mPa.s) | | |
| 300 | 283 | 237 |

Friction value 61% on cotton, 45% on polyester-cotton.

Example 13

14.8% of polyethylene glycol 400 distearate
44.7% of acrylic acid
44.5% of sodium 4-styrendesulfonate

| Shear rate $v_s$ (sec$^{-1}$) | | |
|---|---|---|
| 0.04 | 0.5 | 5.5 |
| Dynamic viscosity $\eta$ (mPa.s) | | |
| 194 | 176 | 155 |

Friction value 60% on cotton, 54% on polyester-cotton.

Example 14

25% of polyethylene glycol 400 distearate
56.4% of acrylic acid
18.6% of dipotassium bis(3-sulfopropyl) itaconate

| Shear rate $v_s$ (sec$^{-1}$) | | |
|---|---|---|
| 0.04 | 0.5 | 5.5 |
| Dynamic viscosity $\eta$ (mPa.s) | | |
| 811 | 742 | 602 |

Friction value 53% on cotton, 46% on polyester-cotton.

Example 15

14.5% of polyethylene glycol 400 distearate
45.9% of acrylamide
19.1% of 2-acrylamido-2-methylpropanesulfonic acid
20.5% of N-vinylpyrrolidone

| Shear rate $v_s$ (sec$^{-1}$) | | |
|---|---|---|
| 0.04 | 0.5 | 5.5 |
| Dynamic viscosity $\eta$ (mPa.s) | | |
| 263 | 263 | 263 |

Friction value 60% on cotton, 61% on polyester-cotton.

Example 16

14.2% of polyethylene glycol 400 distearate
22.1% of acrylamide
63.7% Sodium 4-styrenesulfonate

| Shear rate $v_s$ (sec$^{-1}$) | | |
|---|---|---|
| 0.04 | 0.5 | 5.5 |
| Dynamic viscosity $\eta$ (mPa.s) | | |
| 61 | 61 | 61 |

Friction value 62% on cotton, 67% on polyester-cotton.

Example 17

14.8% of polyethylene glycol 400 distearate
47% of acrylamide
19.5% of 2-acrylamido-2-methylpropanesulfonic acid
18.7% of N-vinyl-N-methylacetamide

| Shear rate $v_s$ (sec$^{-1}$) | | |
|---|---|---|
| 0.04 | 0.5 | 5.5 |
| Dynamic viscosity $\eta$ (mPa.s) | | |
| 61 | 61 | 61 |

Friction value 54% on cotton, 56% on polyester-cotton.

Use Examples

Example 1

100 g of a bleached cotton cretonne fabric are dyed in 2 liters of water in a laboratory jet dyeing machine With the following additions:

0.25 g of a dye of the formula 0.3 g of a dye of the formula

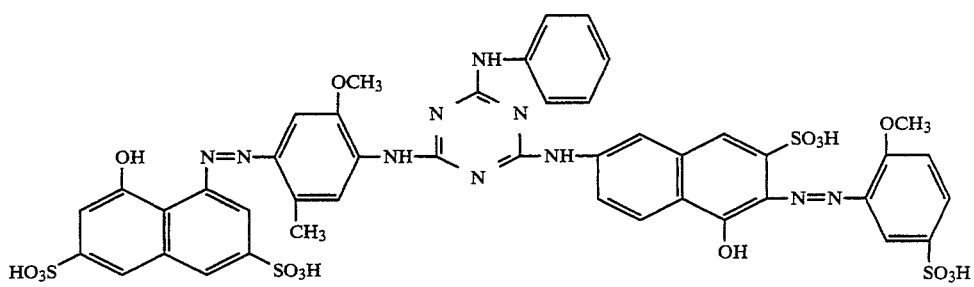

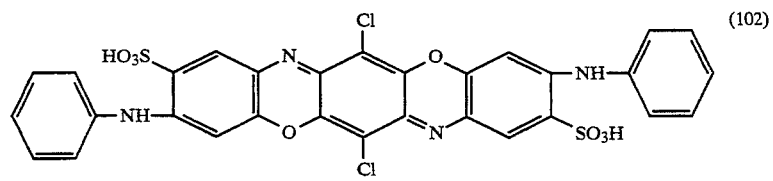

2 g of the copolymer-containing preparation of Example 1

These additions are first dissolved or dispersed in water and added to the dyebath at 50° C. The dyeing liquor is then heated up to 98° C. in the course of 30 minutes with constant circulation and agitation of the substrate. 15 minutes later 20 g of Glauber salt are added to the dyeing liquor. Then the fabric is dyed at 98° C. for a further 30 minutes, whereupon the dyebath is cooled down to 60° C., and the fabric is rinsed hot and cold and dried. A crease-free level grey dyeing is obtained. The use of the preparation according to the present invention brings about a marked reduction in the friction value to 59%. Without the addition of this preparation the friction (substrate on substrate) is 100%. The preparation containing the copolymer does not have a retarding-effect, nor does it alter the hue.

Example 2

100 g of a polyester staple fabric are treated on a winch beck at 30° C. with a dyeing liquor containing 0.25 g of a dye of the formula

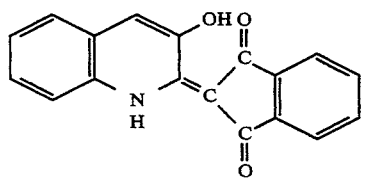

0.35 g of a dye of the formula

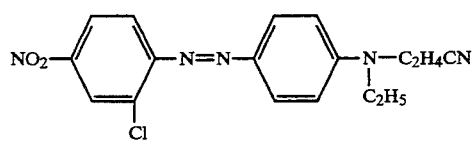

0.15 g of a dye of the formula

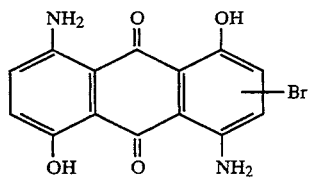

2 g of the preparation of Example 2

2 g of ammonium sulfate and adjusted to pH 5.5 with formic acid. Following a pre-run period of 10 minutes at 30° C., the temperature is raised to 130° C., whereupon the fabric is dyed at that temperature for a further 60 minutes. The liquor is then cooled down to 60° C. and the fabric is rinsed and dried. A crease-free level brown dyeing is obtained. The friction value with the use of the preparation is 63%.

Example 3

100 g of a nylon 6.6 staple fabric are treated on a laboratory jet dyeing machine at 40° C. in 2 liters of water with the following additions:

4 g of the preparation of Example 1

2 g of a condensation product of 1 mol of fatty amine and 70 mol of ethylene oxide The liquor is adjusted to pH 5.5 with acetic acid. Following a pre-run period of 15 minutes at 40° C.

1 g of a dye of the formula

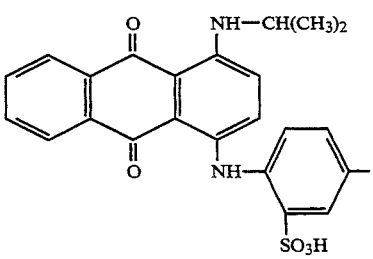

is metered into the liquor, whereupon the liquor is circulated for a further 5 minutes. The liquor is then heated to 98° C. in the course of 30 minutes and dyeing is continued at that temperature for 30 minutes.

The liquor is then cooled down to 60° C. in the course of 15 minutes and the fabric is rinsed and dried. A crease-free level blue dyeing is obtained. The friction value is 68%. No change in shade has occurred.

Example 4

100 g of textured polyester knitwear are dyed in 2.4 liters of water in a laboratory jet dyeing machine with the following additions:

2 g of a dye of the formula

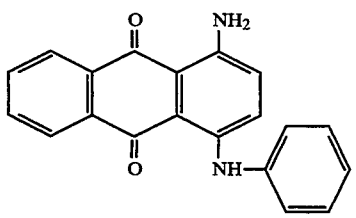
(107)

5 g of ammonium sulfate,
1 g of the ammonium salt of the acid sulfuric ester of a polyadduct of average molecular weight 3200 obtained by addition of propylene oxide onto glycerol,
3 g of the preparation of Example 1 and
0.2 g of 85% formic acid.

These additions are first dissolved or dispersed in water and added to the dyebath at 70° C. The dyeing temperature is then raised to 127° C. in the course of 60 minutes, whereupon the material is dyed at that temperature for a further 60 minutes. The liquor is then cooled down to 60° C. in the course of 10 minutes, and the dyeing is rinsed and dried. It has been dyed a level blue shade.

The friction value is 62%.

Example 5

100 g of a blend fabric composed of 55 parts of polyester and 45 parts of wool are treated on a winch beck at 50° C. with a dyeing liquor containing
  1 kg of a dye (7:3) formed from the dyes of the formula

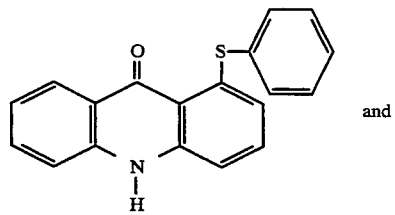
(108)
and

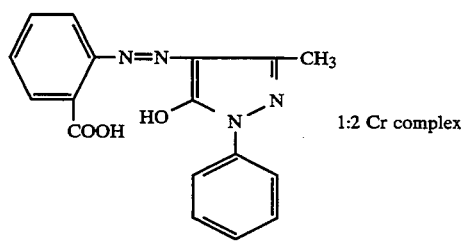
(109)
1:2 Cr complex 0.8 kg of ammonium sulfate,
4 kg of naphthalenesulfonic acid-formaldehyde reaction product,
2 kg of an amphoteric fatty aminopolyglycol ether sulfate and
3 kg of the preparation of Example 2 in 4000 liters of water. The temperature is then raised to 107° C. in the course of 30 minutes, and the fabric is then dyed at that temperature for 1 hour. The bath is then cooled down to 40° C. and the dyed fabric is rinsed and dried. Throughout the entire dyeing process the dyebath is free of foam.

A level fast yellow dyeing is obtained.
The friction value is 58%.

Example 6

To a high temperature dyeing machine containing 100 kg of a 67:33 polyester-cotton blend fabric in 3000 liters of water at 60° C. are first added the following additions:

2 kg of a mixture of the dyes of the formulae

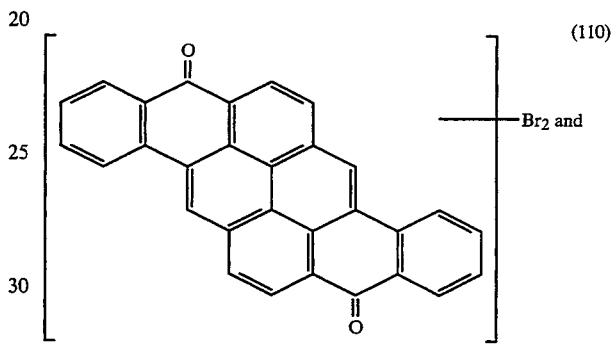
(110)
—Br₂ and

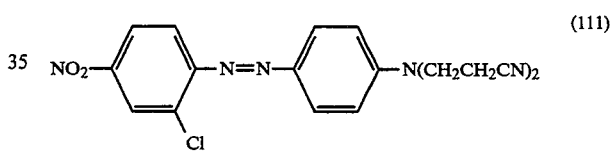
(111)

6 kg of ammonium sulfate and
0.6 kg of a fatty alkylbenzimidazole sulfonate.

This is followed by the addition of 4 kg of the preparation of Example 1. The pH of the liquor is then adjusted to 5 with 85% formic acid and the material is circulated for 15 minutes. The temperature is then raised to 135° C. in the course of 50 minutes and the material is treated at that temperature for 90 minutes. The liquor is then cooled down to 70° C., whereupon the following additions are made to develop the vat dye:
  9 kg of 30% sodium hydroxide solution
  9 kg of 40% hydrosulfite and
  5 kg of sodium chloride.

The dyed material is treated once more at 60° C. for 45 minutes. It is then rinsed, oxidised with hydrogen peroxide, rinsed again and dried. Throughout the entire period of the dyeing process the dyebath is free of foam.

The friction value is 61%.

Example 7

100 g of wool serge (180 g/m²) are dyed in 2.4 liters of water in a laboratory jet dyeing machine with the following additions:
A
  2 g of 80% acetic acid
  5 g of sodium sulfate (anhydrous)
  3 g of the preparation of Example 2
B 0.5 g of a dye of the formula

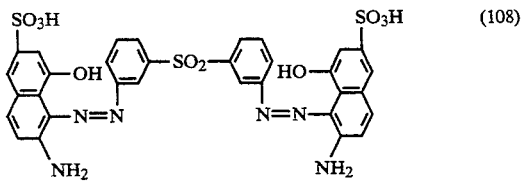

The additions A are first dissolved or dispersed in water and added to the dyebath at 50° C. 5 minutes later the dye (addition B) is added, whereupon the temperature is raised to 90° C. in the course of 30 minutes and the material is dyed at that temperature for 60 minutes. The liquor is then cooled down to 50° C. and the dyeing is rinsed and dried. The result obtained is a fast, level red dyeing which shows very little creasing.

Example 8

10 g of bleached and mercerised cotton tricot are treated in a dyeing machine (AHIBA) at 20° C. with a liquor containing 0.03 g of a fluorescent whitening agent of the formula

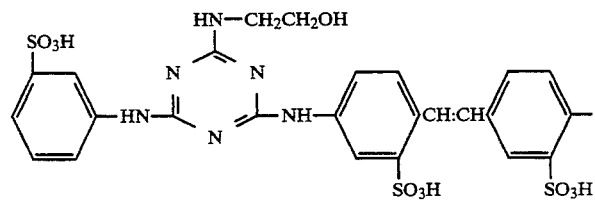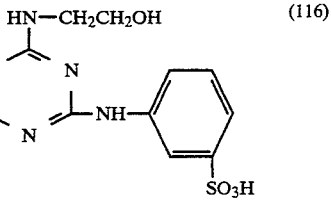

0.5 g of sodium sulfate
0.3 g of the preparation of Example 2
in 400 ml of water. The temperature is then raised to 80° C. in the course of 30 minutes, and the cotton is then treated at that temperature for 30 minutes. The bath is then cooled down to 50° C. and the material is rinsed and dried. A whitened fabric is obtained free of creases.

Example 9

100 kg of a 1:1 polyester-cotton blend fabric are washed at 80° C. for 20 minutes in a rope washer at a liquor ratio of 20:1 with a liquor containing the following additions:

2.5 g/l of a mixture of coco fatty acid diethanolamide and
1-benzyl-2-heptadecylbenzimidazoledisulfonic acid, sodium salt (1:2)
2 g/l of sodium carbonate and
2 g/l of the preparation of Example 2.

The fabric is then rinsed cold and hot. Following the wash the fabric is virtually free of creasing.
friction value is 39%.

What is claimed is:

1. A lubricant-containing aqueous preparation of copolymers obtainable by polymerisation of
(A) 70 to 95% by weight of a monomer mixture of
   (a) 20 to 90% by weight of an ethylenically unsaturated monocarboxylic acid or of a corresponding amide,
   (b) 10 to 80% by weight of vinylsulfonic acid, allylsulfonic acid, 3-acrylamidopropanesulfonic acid, 2-acrylamido-2-methylpropanesulfonic acid, 3-methacrylamidopropanesulfonic acid, 2-sulfopropyl acrylate, 2-sulfopropyl methacrylate, bis(3-sulfopropyl) itaconate, 3-allyloxy-2-hydroxypropylsulfonic acid or 4-styrenesulfonic acid, and
   (c) 0 to 25% by weight of N-vinylpyrrolidone or of an N-vinyl-substituted amide of a saturated aliphatic monocarboxylic acid in the presence of
(B) 5 to 30% by weight of a polyol whose hydroxyl groups have been esterified with a fatty acid of 8 to 26 carbon atoms, the sum totals of (A) and (B) on the one hand and (a), (b) and (c) on the other each adding up to 100%.

2. A preparation according to claim 1, obtainable from 30 to 90% by weight of monomer (a) and 10 to 70% by weight of monomer (b).

3. A preparation according to claim 1, wherein monomer (a) is a monocarboxylic acid or an amide thereof, each of 2 to 5 carbon atoms.

4. A preparation according to claim 1, wherein monomer (a) is acrylic acid, acrylamide or a mixture thereof.

5. A preparation according to claim 1, wherein monomer (b) is 2-acrylamido-2-methylpropanesulfonic acid.

6. A preparation according to claim 1, wherein monomer (c) is N-vinylpyrrolidone or N-vinyl-N-methylacetamide.

7. A preparation according to claim 1, wherein component (B) is a diester of polyalkylene glycols formed from 3 to 100 mol of alkylene oxide, preferably ethylene oxide.

8. A preparation according to claim 1, wherein the polyalkylene glycol has been esterified with a fatty acid of from 12 to 22 carbon atoms.

9. A preparation according to claim 7, wherein the polyalkylene glycol has been esterified with stearic acid.

10. A preparation according to claim 7, wherein the polyalkylene glycol has a molecular weight of 300 to 4400, preferably 300 to 1000.

11. A preparation according to claim 1, wherein component (B) is a trihydric to hexahydric aliphatic alcohol of 3 to 6 carbon atoms which has been esterified with a fatty acid of 8 to 26 carbon atoms, preferably 12 to 22 carbon atoms.

12. A preparation according to claim 11, wherein component (B) is trishydroxymethylpropane tristearate or trishydroxymethylpropane tribehenate.

13. A preparation according to claim 1, obtainable from 75 to 95% by weight of monomer mixture (A) and 5 to 25% by weight of esterified polyol (B).

14. A preparation according to claim 1, wherein the monomer mixture (A) consists of 35 to 85% by weight of the ethylenically unsaturated carboxylic acid or of the ethylenically unsaturated carboxamide (a) and 15 to 65% by weight of the sulfonated vinyl compound (b).

15. A preparation according to claim 1, obtainable from 5 to 25% by weight of the esterified polyol as component (B), 25 to 75% by weight of acrylic acid or acrylamide as monomer (a) and 20 to 40% by weight of the sulfonated vinyl compound as monomer (b), the sum total of the components being 100%.

16. A preparation according to claim 15, wherein the esterified polyol is a diesterified polyethylene oxide adduct having a molecular weight of 300 to 1000.

17. A preparation according to claim 15, wherein monomer (b) is 2-acrylamido-2-methylpropanesulfonic acid.

18. A process for dyeing or whitening textile material containing cellulose fibres, natural or synthetic polyamide fibres, polyacrylonitrile fibres or polyester fibres with appropriate dyes or fluorescent whitening agents, which comprises dyeing or whitening the textile material in the presence of an effective amount of a preparation according to claim 1.

19. A process according to claim 18, wherein textile material containing cellulose fibres, synthetic polyamide fibres or polyester fibres is dyed or whitened.

20. A process according to claim 19, wherein textile material containing polyester fibres is dyed with disperse dyes at a temperature of 70° to 140° C., 21. A process according to claim 20, wherein textile material containing polyester fibres is dyed with disperse dyes at a temperature of 110° to 135° C.

* * * * *